US012739953B2

(12) United States Patent
Wen et al.

(10) Patent No.: US 12,739,953 B2
(45) Date of Patent: Sep. 15, 2026

(54) MULTI-MODE DIMMING AND COLOR TEMPERATURE ADJUSTMENT POWER SUPPLY BASED ON PWM

(71) Applicant: Zhuhai Shengchang Electronics Co., Ltd., Zhuhai City (CN)

(72) Inventors: Guobiao Wen, Zhuhai City (CN); Xianyun Zhao, Zhuhai City (CN); Dehua Zheng, Zhuhai City (CN)

(73) Assignee: Zhuhai Shengchang Electronics Co., Ltd., Zhuhai City (CN)

( * ) Notice: Subject to any disclaimer, the term of this patent is extended or adjusted under 35 U.S.C. 154(b) by 32 days.

(21) Appl. No.: 19/047,605

(22) Filed: Feb. 6, 2025

(65) Prior Publication Data

US 2026/0197911 A1 Jul. 9, 2026

(30) Foreign Application Priority Data

Jan. 6, 2025 (CN) ......................... 202510013134.5

(51) Int. Cl.

| | |
|---|---|
| ***H05B 45/20*** | (2020.01) |
| ***H05B 45/10*** | (2020.01) |
| ***H05B 45/305*** | (2020.01) |
| ***H05B 45/325*** | (2020.01) |
| ***H05B 45/355*** | (2020.01) |
| ***H05B 45/36*** | (2020.01) |
| ***H05B 45/37*** | (2020.01) |
| ***H05B 47/17*** | (2020.01) |

(52) U.S. Cl.
CPC ............. *H05B 45/10* (2020.01); *H05B 45/20* (2020.01); *H05B 45/305* (2020.01); *H05B 45/325* (2020.01); *H05B 45/355* (2020.01); *H05B 45/36* (2020.01); *H05B 45/37* (2020.01); *H05B 47/17* (2020.01)

(58) Field of Classification Search
CPC ........ H05B 45/10; H05B 45/20; H05B 47/17; H05B 45/36; H05B 45/37; H05B 45/305; H05B 45/325; H05B 45/355
See application file for complete search history.

(56) References Cited

U.S. PATENT DOCUMENTS

2021/0392729 A1* 12/2021 Zheng .................... H05B 45/10

FOREIGN PATENT DOCUMENTS

CN 117881039 A 4/2024

* cited by examiner

*Primary Examiner* — Henry Luong
(74) *Attorney, Agent, or Firm* — Rondaus PLLC; George Liu

(57) ABSTRACT

The present disclosure provides a multi-mode dimming and color temperature adjustment power supply based on PWM. The multi-mode dimming and color temperature adjustment power supply based on PWM comprises an EMI and rectification filtering circuit, wherein the EMI and rectification filtering circuit is configured to rectify the power supply into a pulsating DC voltage and output to the phase-cut signal input circuit; a phase-cut signal input circuit, wherein the phase-cut signal input circuit is configured to convert the pulsating DC voltage signal into a first PWM signal and output to the signal processing circuit; a signal processing circuit, wherein the signal processing circuit is configured to convert the first PWM signal into a DC voltage signal and output a second PWM signal to the main control circuit; a main control circuit, wherein the main control circuit is configured to determine a current input signal.

10 Claims, 5 Drawing Sheets

MULTI-MODE DIMMING AND COLOR TEMPERATURE ADJUSTMENT POWER SUPPLY BASED ON PWM

TECHNICAL FIELD

The present disclosure relates to the technical field of power supply, and specifically relates to a multi-mode dimming and color temperature adjustment power supply based on PWM.

BACKGROUND

With the development of intelligent lighting, PWM dimming has emerged as a more convenient, efficient, and safe dimming method compared to traditional linear dimming and silicon-controlled rectifier (SCR) dimming power supplies used for brightness adjustment. However, the existing dimming power supplies have the following shortcomings:

1. Dimming power supplies generally have a single fixed dimming frequency or a single dimming curve, and the dimming accuracy of linear dimmers is relatively low.

2. The dimming functionality is relatively limited. Methods such as SCR dimming and 0-10V analog signal dimming can mostly only perform ordinary dimming and cannot simultaneously meet users' needs for brightness adjustment and color temperature adjustment.

3. Due to the wide variety of functions of existing dimming power supplies, their adaptability and compatibility are low. Dimming controllers of different brands and models may not be fully compatible, resulting in unsatisfactory dimming effects, which can bring considerable inconvenience to users' actual use or increase users' costs.

Therefore, there is an urgent need for a PWM dimming power supply that can realize both dimming and color temperature adjustment functions with high flexibility and compatibility.

SUMMARY

In order to solve the problems generally existing in the prior art, the objective of the present disclosure is to provide a multi-mode dimming and color temperature adjustment power supply based on PWM. The present disclosure achieves a multi-mode dimming and color temperature adjustment power supply by incorporating phase-cutting signal input or dual analog signal input, and a human-machine interaction device, thereby enhancing dimming and color temperature adjustment precision, improving adaptability and compatibility, and enabling intelligent control.

The present disclosure achieves the above objects through the following technical solutions:

A multi-mode dimming and color temperature adjustment power supply based on PWM, comprising a power supply conversion circuit, wherein the power supply conversion circuit is configured to convert an input power supply voltage into a working power supply voltage for a load, and further comprising:

An EMI and rectification filtering circuit, a phase-cut signal input circuit, a signal processing circuit, a main control circuit and a dimming circuit, wherein the EMI and rectification filtering circuit receives a power supply and is configured to filter out high-frequency interference signals in the AC power supply and rectify the power supply into a pulsating DC voltage and output to the phase-cut signal input circuit; the phase-cut signal input circuit is configured to convert the pulsating DC voltage signal into a first PWM signal and output to the signal processing circuit; the signal processing circuit is configured to convert the first PWM signal into a DC voltage signal and output to a first input terminal of the main control circuit and output a second PWM signal to a second input terminal of the main control circuit after filtering; the main control circuit is configured to determine whether a current input signal is a phase-cut dimming signal or a phase-cut carrier color temperature adjustment signal based on a state of the second PWM signal, and if the current input signal is the phase-cut dimming signal, outputs a corresponding first PWM dimming signal to the dimming circuit according to a magnitude of the DC voltage signal to achieve dimming of the load; and if the current input signal is the phase-cut carrier color temperature adjustment signal, performs signal processing and outputs a corresponding second PWM dimming signal to the dimming circuit according to a color temperature data signal to achieve color temperature adjustment of the load.

Wherein, a third input terminal and a fourth input terminal of the main control circuit respectively receive a first analog signal and a second analog signal, and the main control circuit is configured to output the corresponding first PWM dimming signal to the dimming circuit according to a magnitude of the first analog signal to achieve dimming of the load; or adjust a value of the second PWM dimming signal according to a magnitude of the second analog signal to achieve color temperature adjustment of the load.

According to the multi-mode dimming and color temperature adjustment power supply based on PWM provided by the present disclosure, the phase-cut signal input circuit includes a first voltage divider circuit, a first transistor, an optocoupler, a second voltage divider circuit and a second transistor, wherein the first voltage divider circuit is configured to divide the pulsating DC voltage and output to the first transistor; a collector of the first transistor is connected to an input terminal of the optocoupler; an output terminal of the optocoupler is connected to a base of the second transistor; and the second transistor is connected to a DC voltage through the second voltage divider circuit, and a collector of the second transistor outputs the first PWM signal with an amplitude equal to the DC voltage value.

According to the multi-mode dimming and color temperature adjustment power supply based on PWM provided by the present disclosure, the signal processing circuit includes a third voltage divider circuit, a second-order low-pass filter circuit and an RC filter circuit, wherein the first PWM signal is divided by the third voltage divider circuit and output to the second-order low-pass filter circuit, and the second-order low-pass filter circuit is configured to output the DC voltage signal; and the RC filter circuit is configured to filter the first PWM signal and output the second PWM signal.

According to the multi-mode dimming and color temperature adjustment power supply based on PWM provided by the present disclosure, when the main control circuit detects that the second PWM signal contains only one PWM waveform within each period, and the PWM waveform is composed of only one high level and one low level, judging that the second PWM signal is the phase-cut dimming signal.

When the main control circuit detects that the second PWM signal contains two PWM waveforms of different magnitudes within each period, judging that the second PWM signal is the phase-cut carrier color temperature adjustment signal; and wherein the second PWM signal includes a carrier color temperature adjustment code signal sent by a phase-cut carrier controller.

According to the multi-mode dimming and color temperature adjustment power supply based on PWM provided by the present disclosure, the main control device is preset with maximum and minimum dimming signal values, and outputs the first PWM dimming signal with a corresponding duty cycle by comparing the DC voltage signal with the preset values, including:

When the DC voltage signal is greater than or equal to the maximum dimming signal value, the first PWM dimming signal with a 100% duty cycle is output.

When the DC voltage signal is less than or equal to the minimum dimming signal value, the first PWM dimming signal with a 0% duty cycle is output.

When the DC voltage signal is between the maximum and minimum dimming signal values, the duty cycle of the first PWM dimming signal output is:

$$\frac{TD}{\text{MAX}-\text{MIN}}*100\%$$

Where TD is the DC voltage signal value, MAX is the maximum dimming signal value, and MIN is the minimum dimming signal value.

According to the multi-mode dimming and color temperature adjustment power supply based on PWM provided by the present disclosure, the dimming circuit includes a driver circuit and a MOS transistor; and the driver circuit is configured to drive the MOS transistor to operate for dimming according to the first PWM dimming signal.

At least two dimming circuits are included; when in color temperature adjustment mode, one of the dimming circuits is defined as a cool light channel, another as a warm light channel, and at this time, the PWM values of the two channels are complementary.

According to the multi-mode dimming and color temperature adjustment power supply based on PWM provided by the present disclosure, the duty cycle of the second PWM dimming signal output by the main control circuit to the cool light channel is:

$$PWM_L=\frac{K_x-K_{min}}{K_{max}-K_{min}}*100\%$$

Where $K_x$ is the target color temperature value, $K_{min}$ is the lowest color temperature value, and $K_{max}$ is the maximum color temperature value.

The duty cycle of the second PWM dimming signal output by the main control circuit to the warm light channel is:

$$\text{PWM}_N=100\%-\text{PWM}_L$$

By adjusting the duty cycle of the PWM dimming signals input to the two dimming circuits, the color temperature adjustment of the load is achieved.

According to the multi-mode dimming and color temperature adjustment power supply based on PWM provided by the present disclosure, the main control device reads the carrier color temperature adjustment code signal sent by the phase-cut carrier controller, identifies and decodes the corresponding code signal, and adjusts the values of the second PWM dimming signals output to the two dimming circuits based on the color temperature data carried in the code signal.

According to the multi-mode dimming and color temperature adjustment power supply based on PWM provided by the present disclosure, a color temperature span value of a minimum unit signal is obtained based on a voltage range of the second analog signal and a color temperature range of a load lamp, and a total color temperature span value is obtained by multiplying the color temperature span value by the input second analog signal value, thereby adjusting the duty cycles of the second PWM dimming signals input to the two dimming circuits based on the total color temperature span value, thus achieving color temperature adjustment of the load.

According to the multi-mode dimming and color temperature adjustment power supply based on PWM provided by the present disclosure, the multi-mode dimming and color temperature adjustment power supply based on PWM further comprises a human-machine interaction device, the human-machine interaction device is connected to the main control device for parametric adjustment of the dimming and color temperature adjustment power supply to achieve custom parameter settings for dimming frequency, color temperature, dimming curve and power supply output function.

As can be seen, compared to the prior art, the present disclosure offers the following advantages:

1. The present disclosure outputs a PWM signal through the phase-cut signal input circuit, which can be either a phase-cut chopping signal or a phase-cut carrier signal. The signal processing circuit further processes this signal into a DC voltage signal TD and another more stable PWM signal TFS. This allows the main control circuit to determine whether the current input signal is a phase-cut dimming signal or a phase-cut carrier color temperature adjustment signal based on the state of the PWM signal TFS, thereby adjusting the duty cycle of the output PWM dimming signal to achieve dimming or color temperature adjustment through phase-cut input signals. At the same time, the main control circuit also achieves dual analog signal control for dimming or color temperature adjustment by inputting two analog signals. Compared to traditional single dimming modes, the multi-mode dimming and color temperature adjustment power supply of the present disclosure can provide both dimming and color temperature adjustment functions in different modes, and can adopt different modes according to different usage needs, offering a wider range of applicability and more flexible dimming and color temperature adjustment.

2. The present disclosure uses a microcontroller to process the input PWM signal TFS and DC voltage signal TD. By setting maximum and minimum dimming values and outputting a PWM dimming signal with a corresponding duty cycle based on the ratio of the DC voltage signal TD to these values, smooth adjustment of different brightness levels is achieved. Precise color temperature adjustment is achieved through the analysis and processing of the carrier color temperature adjustment code signal. Compared to traditional dimming methods, this approach enables precise dimming and color temperature adjustment, with high efficiency and intelligent control.

3. The present disclosure employs an EMI and rectification filtering circuit, as well as a power factor correction circuit, to significantly reduce the impact of input electromagnetic interference on the dimming and color temperature adjustment power supply. It also prevents the power supply itself from becoming an electromagnetic interference source and emitting interference signals externally. At the same time, it improves the power factor of the power supply, thereby reducing the generation of power harmonics and further lowering the interference of the power supply on the input network. This makes the dimming and color temperature adjustment power supply more suitable for a wider range of input environments, enhancing the product's market competitiveness.

4. The present disclosure incorporates a voltage fine-tuning circuit to enable flexible adjustment of the power supply's output voltage, accommodating dimming needs in different usage scenarios. For example, it can be applied in situations where excessive voltage drop at the end of lighting fixtures or strips due to long power output wiring results in insufficient and inconsistent brightness. When the power supply is installed outdoors or in locations where it is inconvenient to connect an external dimmer, the output voltage of the power supply can also be adjusted through the voltage fine-tuning circuit to achieve different brightness levels of the lighting fixtures. Compared to traditional dimming solutions that rely solely on dimmers, the dimming power supply of the present disclosure is suitable for lighting fixtures of various voltage levels and does not require a dimmer, thereby improving the adaptability and compatibility of the dimming and color temperature adjustment power supply.

5. The present disclosure includes a human-machine interaction device that enables parameterized adjustment of the dimming and color temperature adjustment power supply. Traditional single fixed dimming can now achieve custom parameter settings for dimming frequency, color temperature, dimming curve, and power supply output functions. This allows users to adjust the power supply to the corresponding functional mode based on the actual usage requirements, offering high flexibility and compatibility. At the same time, it significantly reduces the user's operating costs.

The present disclosure will be further described in detail below in conjunction with the accompanying drawings and specific embodiments.

DETAILED DESCRIPTION OF THE EMBODIMENTS

To make the objectives, technical solutions, and advantages of the present disclosure more clear, the technical solutions of the present disclosure will be described clearly and completely below with reference to the accompanying drawings. It is evident that the described embodiments are a part of the embodiments of the present disclosure, rather than all of the embodiments. All other embodiments obtained by a person of ordinary skill in the art without making creative efforts based on the embodiments of the present disclosure fall within the scope of protection of the present disclosure.

The term "embodiment" used herein means that specific features, structures, or characteristics described in conjunction with an embodiment may be included in at least one embodiment of the present disclosure. The appearance of this phrase at various locations in the specification does not necessarily refer to the same embodiment, nor does it represent independent or alternative embodiments that are mutually exclusive with other embodiments. It is explicitly and implicitly understood by those skilled in the art that the embodiments described herein can be combined with other embodiments.

Figure 1:
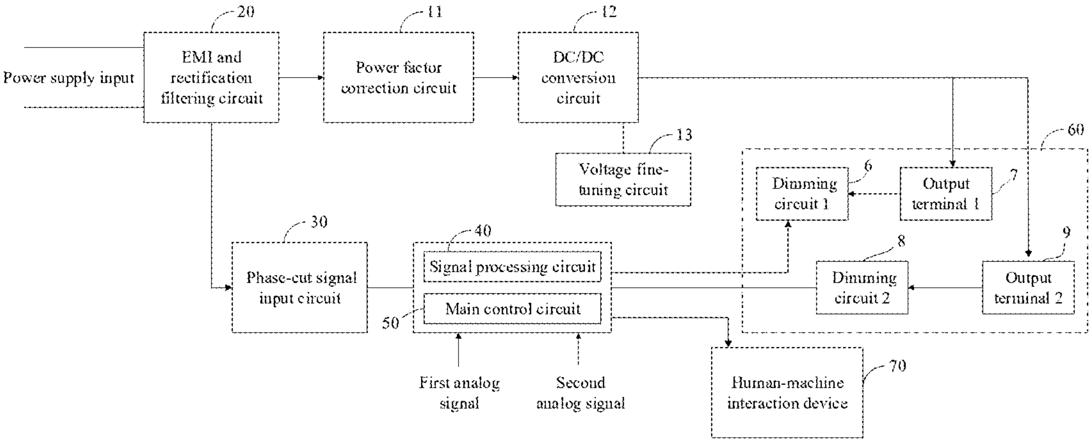
FIG. 1 is a schematic diagram of an embodiment of a multi-mode dimming and color temperature adjustment power supply based on PWM according to the present disclosure.

Referring to FIG. 1, the present disclosure provides a multi-mode dimming and color temperature adjustment power supply based on PWM, comprising a power supply conversion circuit, wherein the power supply conversion circuit is configured to convert an input power supply voltage into a working power supply voltage for a load, and further comprising:

An EMI and rectification filtering circuit 20, a phase-cut signal input circuit 30, a signal processing circuit 40, a main control circuit 50 and a dimming circuit 60, wherein the EMI and rectification filtering circuit 20 receives a power supply and is configured to filter out high-frequency interference signals in the AC power supply and rectify the power supply into a pulsating DC voltage and output to the phase-cut signal input circuit 30; the phase-cut signal input circuit 30 is configured to convert the pulsating DC voltage signal into a first PWM signal and output to the signal processing circuit 40; the signal processing circuit 40 is configured to convert the first PWM signal into a DC voltage signal TD and output to a first input terminal of the main control circuit 50 and output a second PWM signal TFS to a second input terminal of the main control circuit 50 after filtering; the main control circuit 50 is configured to determine whether a current input signal is a phase-cut dimming signal or a phase-cut carrier color temperature adjustment signal based on a state of the second PWM signal TFS, and if the current input signal is the phase-cut dimming signal, outputs a corresponding first PWM dimming signal to the dimming circuit 60 according to a magnitude of the DC voltage signal TD to achieve dimming of the load; and if the current input signal is the phase-cut carrier color temperature adjustment signal, performs signal processing and outputs a corresponding second PWM dimming signal to the dimming circuit 60 according to a color temperature data signal to achieve color temperature adjustment of the load.

Wherein, a third input terminal and a fourth input terminal of the main control circuit 50 respectively receive a first analog signal and a second analog signal, and the main control circuit 50 is configured to output the corresponding first PWM dimming signal to the dimming circuit 60 according to a magnitude of the first analog signal to achieve dimming of the load; or adjust a value of the second PWM dimming signal according to a magnitude of the second analog signal to achieve color temperature adjustment of the load.

Specifically, the EMI and rectification filtering circuit 20 in this embodiment includes an EMI filtering circuit and a rectification filtering circuit. The EMI filtering circuit is used to filter out high-frequency interference signals in the power supply, protecting sensitive components inside the power supply from the impact of these high-frequency interference signals. For example, when switching devices operate in a high-frequency on-off state, the rapid transient process at high frequencies can generate electromagnetic disturbance (EMD) sources. These interferences can be filtered out by the EMI filtering circuit composed of capacitors, inductors, etc., which also prevents the power supply from becoming an external interference source, ensuring the normal operation of the equipment. The rectification filtering circuit adopts diode rectification to convert alternating current into pulsating direct current.

Specifically, the aforementioned EMI and rectification filtering circuit 20 in this embodiment is merely exemplary and not the only approach. For instance, the EMI and rectification filtering circuit 20 can adopt an integrated control circuit, which not only filters out interference electromagnetic waves generated in the device but also ensures efficient and stable operation of the circuit by precisely controlling key parameters within the circuit, thereby improving signal quality.

Specifically, the power supply conversion circuit in this embodiment includes a power factor correction circuit 11 and a DC/DC conversion circuit 12. The power factor correction circuit 11 is connected to the output terminal of the EMI and rectification filtering circuit 20 and is used to adjust the operating state of the circuit by detecting the phase and waveform of the input pulsating DC voltage and its current, in order to reduce the phase difference between the two, thereby improving the power factor of the power supply and achieving the effects of reducing harmonic generation and enhancing energy utilization efficiency. At the same time, it performs secondary rectification and filtering on the pulsating DC voltage to ensure that a more stable and smooth DC voltage is provided to the subsequent DC/DC conversion circuit 12, thereby further optimizing the efficiency and performance of the power supply. The DC/DC conversion circuit 12 adopts a feedback control mode, which is used to convert the secondary rectified DC voltage into the operating power supply voltage required by the connected load lamp based on preset parameters of the internal voltage feedback control loop.

Figure 3:
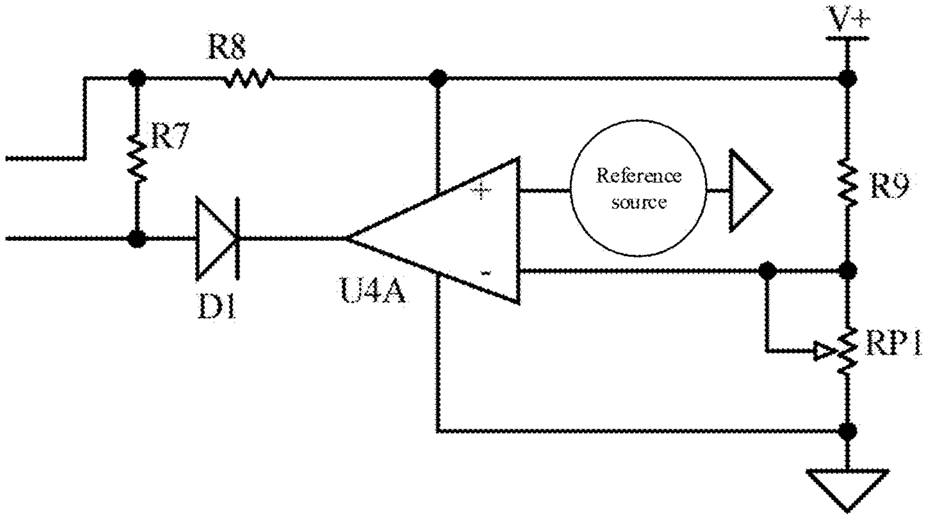
FIG. 3 is a schematic diagram of the voltage fine-tuning circuit in an embodiment of a multi-mode dimming and color temperature adjustment power supply based on PWM according to the present disclosure.

Referring to FIG. 3, specifically, this embodiment also includes a voltage fine-tuning circuit 13, which is connected to the output terminal of the DC/DC conversion circuit 12 and is used to set the feedback parameters of the voltage feedback control loop. The voltage fine-tuning circuit 13 employs adjustable components to adjust the feedback parameters, such as a potentiometer RP1, which is connected to the voltage feedback control loop. By adjusting the potentiometer RP1, the feedback parameters can be changed.

Figure 2:
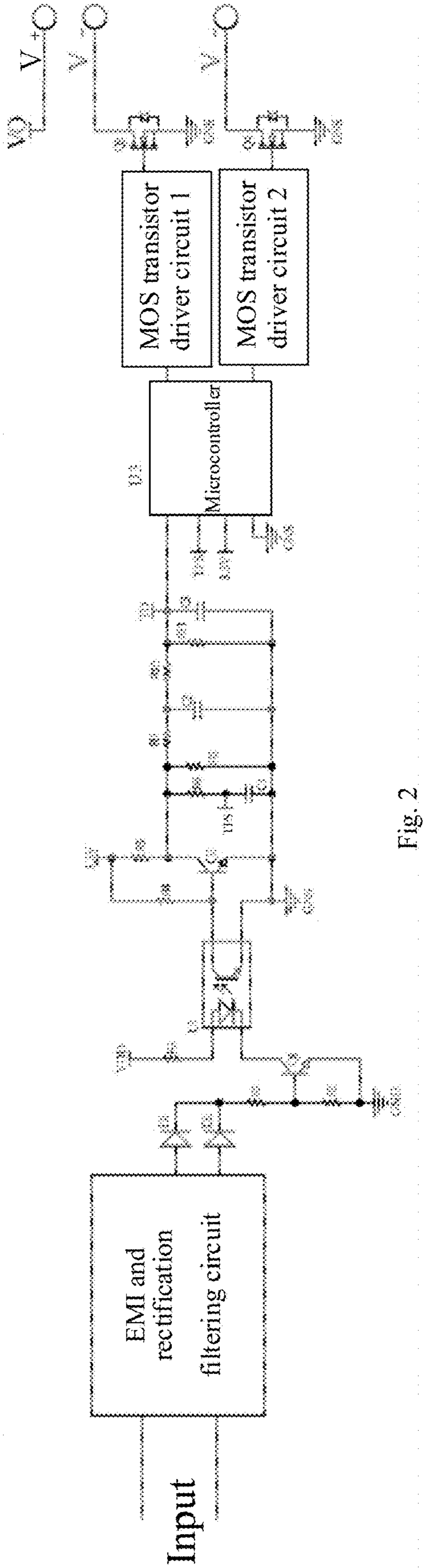
FIG. 2 is a circuit schematic diagram of an embodiment of a multi-mode dimming and color temperature adjustment power supply based on PWM according to the present disclosure.

Referring to FIG. 2, in this embodiment, the phase-cut signal input circuit 30 includes a first voltage divider circuit, a first transistor Q1, an optocoupler U1, a second voltage divider circuit and a second transistor Q2, wherein the first voltage divider circuit is configured to divide the pulsating DC voltage and output to the first transistor Q1; a collector of the first transistor Q1 is connected to an input terminal of the optocoupler U1; an output terminal of the optocoupler U1 is connected to a base of the second transistor Q2; and the second transistor Q2 is connected to a DC voltage through the second voltage divider circuit, and a collector of the second transistor Q2 outputs the first PWM signal with an amplitude equal to the DC voltage value.

Specifically, in this embodiment, the first voltage divider circuit comprises resistors R1 and R2. The EMI and rectification filtering circuit 20 rectifies the AC power supply through diodes D1 and D2 to output the pulsating DC voltage. This voltage is connected to the base of the first transistor Q1 via resistor R1, while resistor R2 is connected in parallel between the base and emitter of the first transistor Q1. Resistors R1 and R2 are used to divide the pulsating DC voltage. When the voltage drop across resistor R2 is greater than the conduction voltage between the base and emitter of the first transistor Q1, the first transistor Q1 is in a saturated conduction state. When the voltage drop across resistor R2 is less than the conduction voltage between the base and emitter of the first transistor Q1, the first transistor Q1 is in a cutoff state, and at this time, its collector outputs a PWM signal.

Specifically, in this embodiment, the optocoupler U1 is used for opto-isolation. The anode of the light-emitting diode at its input terminal is connected to the power supply VDD through resistor R3, and its cathode is grounded through the first transistor Q1. The first output terminal of the phototransistor at its output terminal is connected to the base of the second transistor Q2, and its second output terminal is grounded.

Specifically, in this embodiment, the second voltage divider circuit comprises resistors R4 and R5. The collector of the second transistor Q2 is connected to a 3.3V DC voltage through resistor R5, its base is connected to the 3.3V DC voltage through resistor R4, and its emitter is grounded.

When the first transistor Q1 is in a conduction state, the power supply VDD flows through resistor R3, the light-emitting diode of the optocoupler U1 and the first transistor Q1 to ground GND in sequence. At this time, the phototransistor of the optocoupler U1 is conducting, and the 3.3V DC voltage flows through the biasing resistor R4 to the base of the second transistor Q2, while also flowing through the phototransistor of the optocoupler U1 to ground GNS. As a result, the base voltage of the second transistor Q2 is pulled down to 0V, and the second transistor Q2 is in a cutoff state. Simultaneously, the 3.3V DC voltage flows through the current-limiting resistor R5 to the collector of the second transistor Q2, causing the collector of the second transistor Q2 to output a high level.

When the first transistor Q1 is in a cutoff state, the phototransistor of the optocoupler U1 is not conducting. The 3.3V DC voltage flows through the biasing resistor R4 to the base of the second transistor Q2, causing the base of the second transistor Q2 to output a high level, and the second transistor Q2 to conduct. Simultaneously, the 3.3V DC voltage flows through the current-limiting resistor R5 to the collector of the second transistor Q2, and with its emitter grounded, the collector voltage of the second transistor Q2 is pulled down to 0V The collector of transistor Q2 outputs a low level, and at this time, the collector of the second transistor Q2 outputs a first PWM signal with an amplitude of 3.3V.

In this embodiment, the signal processing circuit 40 includes a third voltage divider circuit, a second-order low-pass filter circuit and an RC filter circuit, wherein the first PWM signal is divided by the third voltage divider circuit and output to the second-order low-pass filter circuit, and the second-order low-pass filter circuit is configured to output the DC voltage signal TD; and the RC filter circuit is configured to filter the first PWM signal and output the second PWM signal TFS.

Specifically, in this embodiment, the third voltage divider circuit is composed of resistor R8 connected in parallel between the collector and emitter of the second transistor Q2. The second-order low-pass filter circuit is constructed by cascading two first-order RC filters, which include resistors R9, R10, R11, and capacitors C2, C3. Resistor R9 and capacitor C2 form the front-end filter. The first PWM signal, after being divided by resistor R8, is connected to resistor R9 and then to capacitor C2. The cutoff frequency of this front-end filter is:

$$f_c1=1/(2\pi R_1 C_1)$$

Where $R_1$ is the resistance value of resistor R9, and $C_1$ is the capacitance value of capacitor C2.

Resistors R10, R11, and capacitor C3 constitute the rear-end filter. The voltage signal output from the front-end filter is connected to resistor R10 and then to capacitor C3. Resistor R11 is connected in parallel across capacitor C3. The cutoff frequency of this rear-end filter is:

$$f_c2=1/(2\pi R_2 C_2)$$

Where $R_2$ is the equivalent resistance value of the circuit as seen by capacitor C3 when connected in series with resistors R10 and R11, and $C_2$ is the capacitance value of capacitor C3.

From the above, it can be seen that the total cutoff rate of the second-order low-pass filter circuit is:

$$f_c=1/(2\pi\sqrt{R_1 R_2 C_1 C_2})$$

It is evident that the second-order low-pass filter circuit can significantly reduce the voltage ripple of the first PWM signal, thereby obtaining a smooth DC voltage signal TD.

Specifically, in this embodiment, the RC filter circuit comprises a resistor R6 and a capacitor C1, which are connected in series and then in parallel between the collector and emitter of the second transistor Q2. The second PWM signal TFS is output from the common connection point of resistor R6 and capacitor C1 to the main control circuit 50.

Figure 4:
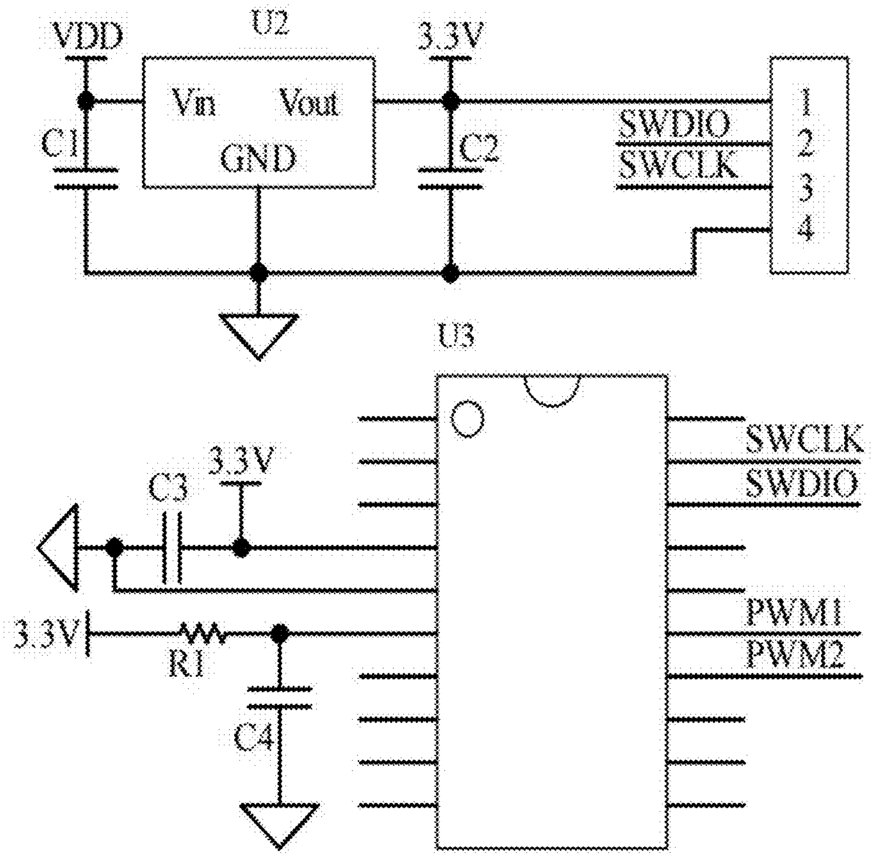
FIG. 4 is a schematic diagram of the main control circuit in an embodiment of a multi-mode dimming and color temperature adjustment power supply based on PWM according to the present disclosure.

Referring to FIG. 4, specifically, in this embodiment, the main control circuit 50 includes a microcontroller U3 and its peripheral circuit. Two detection interfaces of the microcontroller U3 are connected to the DC voltage signal TD and the second PWM signal TFS, respectively, and output a second PWM dimming signal to two dimming circuits 60.

Figure 5:
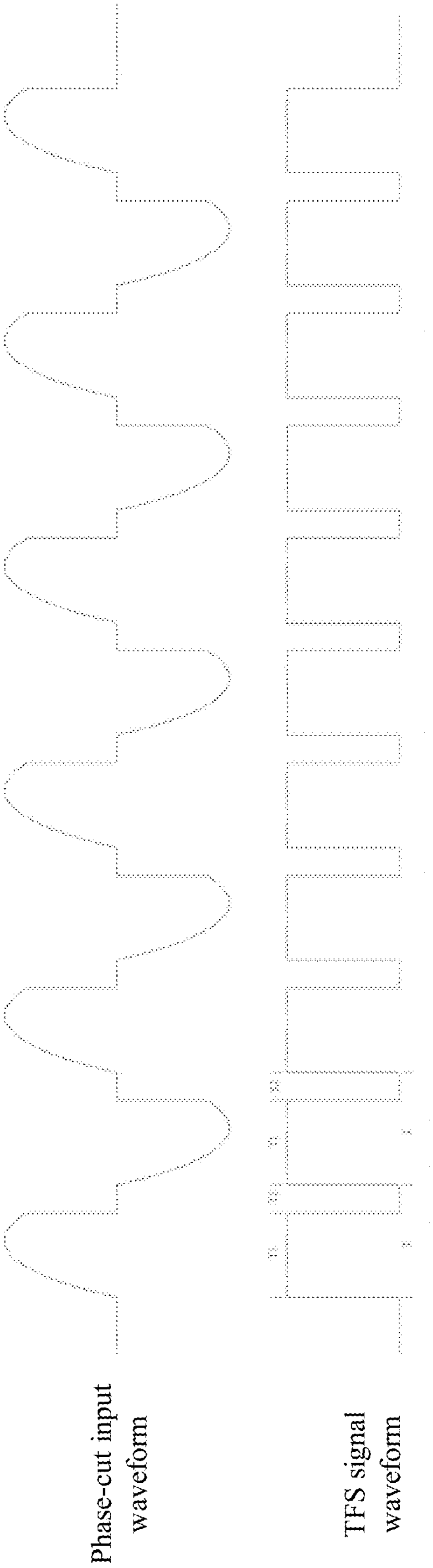
FIG. 5 is a PWM signal waveform diagram for phase-cut chopping signal dimming in an embodiment of a multi-mode dimming and color temperature adjustment power supply based on PWM according to the present disclosure.

Referring to FIG. 5, in this embodiment, when the main control circuit 50 detects that the second PWM signal TFS contains only one PWM waveform within each period, and the PWM waveform is composed of only one high level and one low level, judging that the second PWM signal is the phase-cut dimming signal. Within one period T, there is only a single PWM square wave consisting of a high level T1 and a low level T2.

Figure 6:
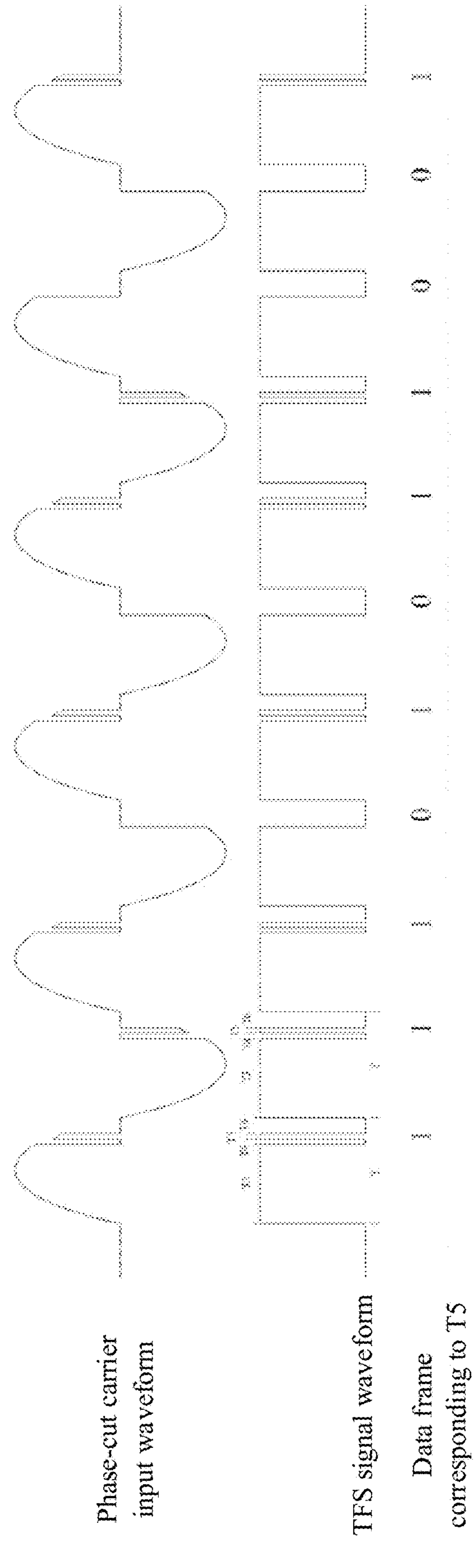
FIG. 6 is a PWM signal waveform diagram for phase-cut carrier color adjustment in an embodiment of a multi-mode dimming and color temperature adjustment power supply based on PWM according to the present disclosure.

Referring to FIG. 6, when the main control circuit 50 detects that the second PWM signal TFS contains two PWM waveforms of different magnitudes within each period, judging that the second PWM signal is the phase-cut carrier color temperature adjustment signal; wherein the second PWM signal TFS includes a carrier color temperature adjustment code signal sent by a phase-cut carrier controller. Refer to the figure. Within one period T, there is a large PWM square wave consisting of a high level T3 and a low level T4, as well as a small PWM square wave consisting of a high level T5 and a low level T6. Here, T5 represents the carrier color temperature adjustment code signal emitted by the phase-cut carrier controller.

In this embodiment, the main control device is preset with maximum and minimum dimming signal values, and outputs the first PWM dimming signal with a corresponding duty cycle by comparing the DC voltage signal TD with the preset values, including:

When the DC voltage signal TD is greater than or equal to the maximum dimming signal value, the first PWM dimming signal with a 100% duty cycle is output.

When the DC voltage signal TD is less than or equal to the minimum dimming signal value, the first PWM dimming signal with a 0% duty cycle is output.

When the DC voltage signal TD is between the maximum and minimum dimming signal values, the duty cycle of the first PWM dimming signal output is:

$$\frac{TD}{\text{MAX}-\text{MIN}}*100\%$$

Where TD is the DC voltage signal TD value, MAX is the maximum dimming signal value, and MIN is the minimum dimming signal value.

In this embodiment, the dimming circuit 60 includes a driver circuit and a MOS transistor; and the driver circuit is configured to drive the MOS transistor to operate for dimming according to the first PWM dimming signal.

At least two dimming circuits 60 are included; when in color temperature adjustment mode, one of the dimming circuits 60 is defined as a cool light channel, another as a warm light channel, and at this time, the PWM values of the two channels are complementary.

Specifically, in this embodiment, the two dimming circuits 60 have identical circuit structures, each comprising a MOS transistor driver circuit 1, a MOS transistor driver circuit 2, and a first MOS transistor Q3, a second MOS transistor Q4. The sum of the duty cycles of the PWM dimming signals for the two channels is 100%.

Specifically, in this embodiment, when the first PWM dimming signal with a duty cycle of 100% is input, the MOS transistor driver circuit 1 and the MOS transistor driver circuit 2 drive the first MOS transistor Q3 and the second MOS transistor Q4 to be fully conducting, respectively, causing the dimming power supply to reach its maximum output and the load lamp to reach its brightest state. When the first PWM dimming signal with a duty cycle of 0% is input, the MOS transistor driver circuit 1 and the MOS transistor driver circuit 2 drive the first MOS transistor Q3 and the second MOS transistor Q4 to be fully non-conducting, respectively, resulting in no output from the dimming power supply and the load lamp being off. As the duty cycle of the first PWM dimming signal increases, the brightness of the load lamp increases, and vice versa.

In this embodiment, the duty cycle of the second PWM dimming signal output by the main control circuit 50 to the cool light channel is:

$$PWM_L=\frac{K_x-K_{min}}{K_{max}-K_{min}}*100\%$$

Where $K_x$ is the target color temperature value, $K_{min}$ is the lowest color temperature value, and $K_{max}$ is the maximum color temperature value.

The duty cycle of the second PWM dimming signal output by the main control circuit 50 to the warm light channel is:

$$PWM_N=100\%-PWM_L$$

By adjusting the duty cycle of the PWM dimming signals input to the two dimming circuits 60, the color temperature adjustment of the load is achieved.

In this embodiment, the main control device reads the carrier color temperature adjustment code signal sent by the phase-cut carrier controller, identifies and decodes the corresponding code signal, and adjusts the values of the second PWM dimming signals output to the two dimming circuits 60 based on the color temperature data carried in the code signal.

Specifically, in this embodiment, each data frame of the carrier color temperature adjustment code signal contains multiple code signals. When the detected code signal T5 is in the high level state, it is counted as 1; when it is in the low level state, it is counted as 0. The microcontroller U3 combines these multiple code signals to reconstruct the frame data and parses out the color temperature data defined within the frame data. Taking the adjustment of color temperature within the range of 2700K~6500K as an example, when the microcontroller U3 receives the target color temperature frame data of 3000K in the color temperature data, the duty cycle of the second PWM dimming signal output to the cool light channel is:

$$PWM_L = \frac{3000K - 2700K}{6500K - 2700K} * 100\% \approx 7.89\%$$

The duty cycle of the second PWM dimming signal output to the warm light channel is:

$$PWM_N = 100\% - 7.89\% = 9211\%$$

The above embodiment is merely exemplary, and the duty cycle of the PWM dimming signal for other color temperature values can be adjusted according to actual needs using the aforementioned method.

Specifically, in addition to the dimming or color temperature adjustment mode controlled by the phase-cut input signal mentioned above, this embodiment also includes controlling the dimming or color temperature adjustment mode through dual analog signals. The first analog signal and the second analog signal are input to the detection pins of the microcontroller U3. The microcontroller U3 compares the magnitude of the first analog signal with its preset maximum and minimum values for the dimming signal, and outputs the first PWM dimming signal with a corresponding duty cycle. The process is similar to the dimming mode controlled by the phase-cut input signal described above, and will not be repeated here.

In this embodiment, a color temperature span value of a minimum unit signal is obtained based on a voltage range of the second analog signal and a color temperature range of a load lamp, and a total color temperature span value is obtained by multiplying the color temperature span value by the input second analog signal value, thereby adjusting the duty cycles of the second PWM dimming signals input to the two dimming circuits 60 based on the total color temperature span value, thus achieving color temperature adjustment of the load.

Specifically, in this embodiment, the color temperature span value of the minimum unit signal is:

$$k = \frac{K_{max} - K_{min}}{V_{max} - V_{min}}$$

Where $V_{max}$ is the maximum input value of the second analog signal, and $V_{min}$ is the minimum input value of the second analog signal.

Specifically, in this embodiment, taking the second analog signal with an input range of 0~10V as an example, when adjusting the color temperature range to 3000K~7000K, the color temperature span value of the minimum unit signal is:

$$k = \frac{7000K - 3000K}{10V - 0V} = 400K/V$$

When the input value of the second analog signal is 2.3V, the total color temperature span value that needs to be adjusted is:

$$\Delta K = 2.3V * 400K/V = 920K$$

That is, the target color temperature value of the load lamp at this time is: 3000K+920K=3920K. Based on the calculation formula for the duty cycle of the second PWM dimming signal mentioned above, the duty cycle of the second PWM dimming signal output by the microcontroller U3 to the cool light channel can be obtained as:

$$PWM_L = \frac{\Delta K}{K_{max} - K_{min}} * 100\% = \frac{920K}{7000K - 3000K} * 100\% = 23\%$$

Then, the duty cycle of the second PWM dimming signal output to the warm light channel is:

$$PWM_N = 100\% - 23\% = 77\%$$

In this embodiment, the multi-mode dimming and color temperature adjustment power supply based on PWM further comprises a human-machine interaction device 70, the human-machine interaction device 70 is connected to the main control device for parametric adjustment of the dimming and color temperature adjustment power supply to achieve custom parameter settings for dimming frequency, color temperature, dimming curve and power supply output function.

Specifically, in this embodiment, the human-machine interaction device 70 can be connected to the microcontroller U3 using components such as an NFC circuit, a gear switch, a button control circuit, or a touch panel for human-machine interaction, thereby enabling parameter settings. For example, when using a gear switch, to set the dimming curve output by the dimming power supply, one simply needs to switch the gear to a preset position with predefined output curve parameters, which will change the current dimming curve output by the dimming power supply. Alternatively, using a button control circuit or touch panel allows for custom settings of the dimming curve output by the dimming power supply. Similarly, parameters such as dimming frequency, color temperature, or color can also be adjusted through the human-machine interaction interface.

The technical features of the above embodiments can be combined arbitrarily. For brevity, not all possible combinations of the technical features in the embodiments are described. However, as long as the combinations of these technical features do not contradict each other, they should be considered within the scope of the present disclosure.

The above-mentioned embodiments are only preferred embodiments of the present disclosure and cannot be used to limit the scope of protection of the present disclosure. Any non-substantive changes and substitutions made by those skilled in the art on the basis of the present disclosure shall belong to the scope of protection claimed by the present disclosure.

What is claimed is:

1. A multi-mode dimming and color temperature adjustment power supply based on Pulse Width Modulation (PWM), comprising a power supply conversion circuit, wherein the power supply conversion circuit is configured to convert an input power supply voltage into a working power supply voltage for a load, and further comprising:

an Electromagnetic Interference (EMI) and rectification filtering circuit, a phase-cut signal input circuit, a signal processing circuit, a main control circuit and a dimming circuit, wherein the EMI and rectification filtering circuit receives a power supply and is configured to filter out high-frequency interference signals in the AC power supply and rectify the power supply into a pulsating DC voltage and output to the phase-cut signal input circuit; the phase-cut signal input circuit is configured to convert the pulsating DC voltage signal into a first PWM signal and output to the signal processing circuit; the signal processing circuit is configured to convert the first PWM signal into a DC voltage signal and output to a first input terminal of the main control circuit and output a second PWM signal to a second input terminal of the main control circuit after filtering; the main control circuit is configured to determine whether a current input signal is a phase-cut dimming signal or a phase-cut carrier color temperature adjustment signal based on a state of the second PWM signal, and if the current input signal is the phase-cut dimming signal, outputs a corresponding first PWM dimming signal to the dimming circuit according to a magnitude of the DC voltage signal to achieve dimming of the load; and if the current input signal is the phase-cut carrier color temperature adjustment signal, performs signal processing and outputs a corresponding second PWM dimming signal to the dimming circuit according to a color temperature data signal to achieve color temperature adjustment of the load;

wherein, a third input terminal and a fourth input terminal of the main control circuit respectively receive a first analog signal and a second analog signal, and the main control circuit is configured to output the corresponding first PWM dimming signal to the dimming circuit according to a magnitude of the first analog signal to achieve dimming of the load; or adjust a value of the second PWM dimming signal according to a magnitude of the second analog signal to achieve color temperature adjustment of the load.

2. The multi-mode dimming and color temperature adjustment power supply based on PWM according to claim 1, wherein, the phase-cut signal input circuit includes a first voltage divider circuit, a first transistor, an optocoupler, a second voltage divider circuit and a second transistor, wherein the first voltage divider circuit is configured to divide the pulsating DC voltage and output to the first transistor; a collector of the first transistor is connected to an input terminal of the optocoupler; an output terminal of the optocoupler is connected to a base of the second transistor; and the second transistor is connected to a DC voltage through the second voltage divider circuit, and a collector of the second transistor outputs the first PWM signal with an amplitude equal to the DC voltage value.

3. The multi-mode dimming and color temperature adjustment power supply based on PWM according to claim 2, wherein, the signal processing circuit includes a third voltage divider circuit, a second-order low-pass filter circuit and an RC filter circuit, wherein the first PWM signal is divided by the third voltage divider circuit and output to the second-order low-pass filter circuit, and the second-order low-pass filter circuit is configured to output the DC voltage signal; and the RC filter circuit is configured to filter the first PWM signal and output the second PWM signal.

4. The multi-mode dimming and color temperature adjustment power supply based on PWM according to claim 1, wherein, when the main control circuit detects that the second PWM signal contains only one PWM waveform within each period, and the PWM waveform is composed of only one high level and one low level, judging that the second PWM signal is the phase-cut dimming signal; and when the main control circuit detects that the second PWM signal contains two PWM waveforms of different magnitudes within each period, judging that the second PWM signal is the phase-cut carrier color temperature adjustment signal; and wherein the second PWM signal includes a carrier color temperature adjustment code signal sent by a phase-cut carrier controller.

5. The multi-mode dimming and color temperature adjustment power supply based on PWM according to claim 4, wherein, the main control device is preset with maximum and minimum dimming signal values, and outputs the first PWM dimming signal with a corresponding duty cycle by comparing the DC voltage signal with the preset values, including:

when the DC voltage signal is greater than or equal to the maximum dimming signal value, the first PWM dimming signal with a 100% duty cycle is output;

when the DC voltage signal is less than or equal to the minimum dimming signal value, the first PWM dimming signal with a 0% duty cycle is output; and when the DC voltage signal is between the maximum and minimum dimming signal values, the duty cycle of the first PWM dimming signal output is:

$$\frac{TD}{\text{MAX} - \text{MIN}} * 100\%$$

where TD is the DC voltage signal value, MAX is the maximum dimming signal value, and MIN is the minimum dimming signal value.

6. The multi-mode dimming and color temperature adjustment power supply based on PWM according to claim 4, wherein, the dimming circuit includes a driver circuit and a MOS transistor; and the driver circuit is configured to drive the MOS transistor to operate for dimming according to the first PWM dimming signal; and at least two dimming circuits are included; when in color temperature adjustment mode, one of the dimming circuits is defined as a cool light channel, another as a warm light channel, and at this time, the PWM values of the two channels are complementary.

7. The multi-mode dimming and color temperature adjustment power supply based on PWM according to claim 6, wherein, the duty cycle of the second PWM dimming signal output by the main control circuit to the cool light channel is:

$$PWM_L = \frac{K_x - K_{min}}{K_{max} - K_{min}} * 100\%$$

where $K_x$ is the target color temperature value, $K_{min}$ is the lowest color temperature value, and $K_{max}$ is the maximum color temperature value; and the duty cycle of the second PWM dimming signal output by the main control circuit to the warm light channel is:

$PWM_N = 100\% - PWM_L$ by adjusting the PWM ratio of the two dimming circuits, the color temperature adjustment of the load is achieved.

8. The multi-mode dimming and color temperature adjustment power supply based on PWM according to claim 7, wherein, the main control device reads the carrier color temperature adjustment code signal sent by the phase-cut carrier controller, identifies and decodes the corresponding code signal, and adjusts the values of the second PWM dimming signals output to the two dimming circuits based on the color temperature data carried in the code signal.

9. The multi-mode dimming and color temperature adjustment power supply based on PWM according to claim 7, wherein, a color temperature span value of a minimum unit signal is obtained based on a voltage range of the second analog signal and a color temperature range of a load lamp, and a total color temperature span value is obtained by multiplying the color temperature span value by the input second analog signal value, thereby adjusting the duty cycles of the second PWM dimming signals input to the two dimming circuits based on the total color temperature span value, thus achieving color temperature adjustment of the load.

10. The multi-mode dimming and color temperature adjustment power supply based on PWM according to claim 1, further comprising a human-machine interaction device, the human-machine interaction device is connected to the main control device for parametric adjustment of the dimming and color temperature adjustment power supply to achieve custom parameter settings for dimming frequency, color temperature, dimming curve and power supply output function.

* * * * *